No. 843,161. PATENTED FEB. 5, 1907.
P. MAST.
FENCE GATE.
APPLICATION FILED SEPT. 11, 1905. RENEWED JULY 24, 1906.
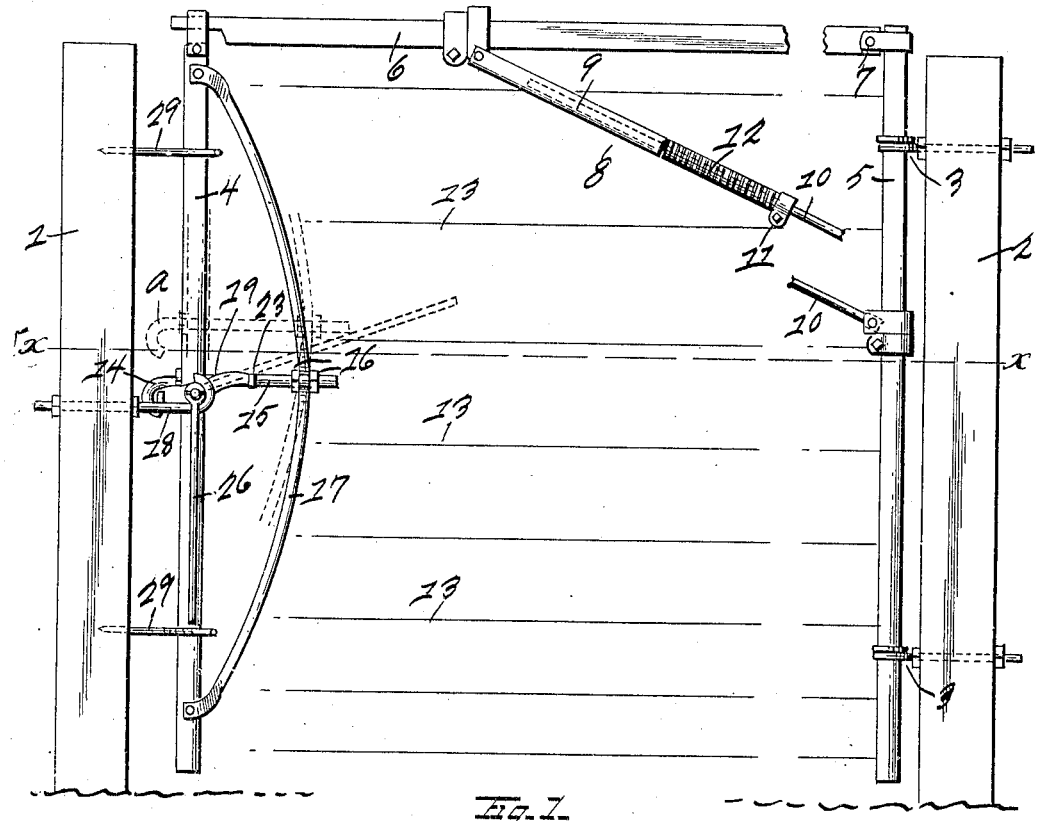
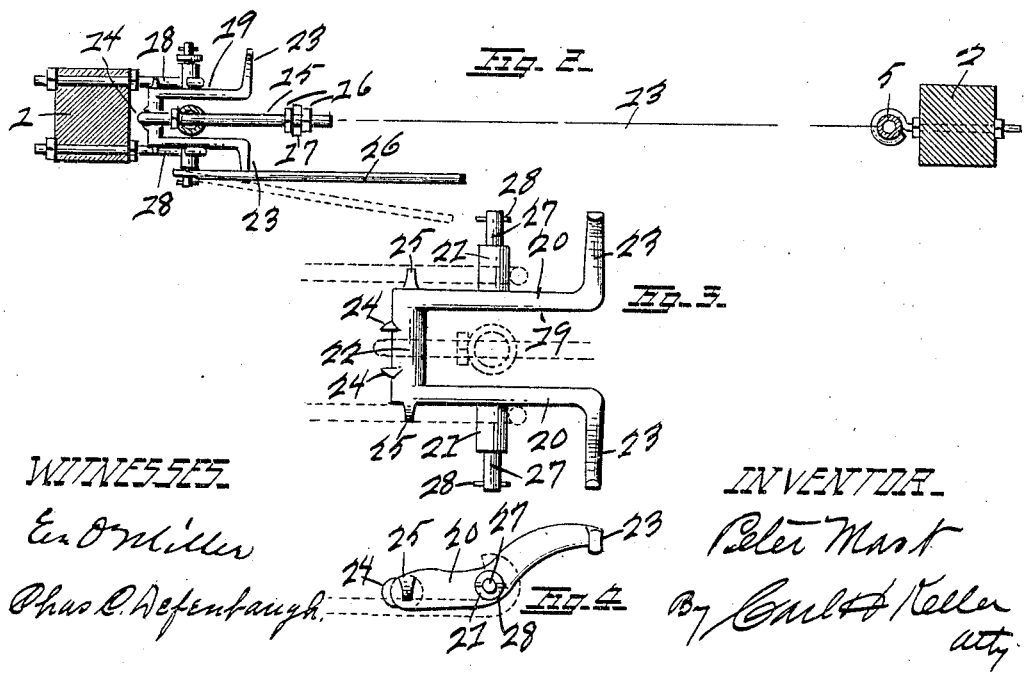
WITNESSES
INVENTOR
Peter Mast

UNITED STATES PATENT OFFICE.

PETER MAST, OF ADRIAN, MICHIGAN.

FENCE-GATE.

No. 843,161.  Specification of Letters Patent.  Patented Feb. 5, 1907.

Application filed September 11, 1905. Renewed July 24, 1906. Serial No. 327,505.

*To all whom it may concern:*

Be it known that I, PETER MAST, of Adrian, county of Lenawee, and State of Michigan, have invented certain new and useful Improvements in Fence-Gates; and I do hereby declare that the following is a full, clear, and exact description thereof, which will enable others skilled in the art to which it appertains to make and use the same, reference being had to the accompanying drawings, and to the figures of reference marked thereon, which form part of this specification.

My invention has reference to fence-gates, and has especial relation to means for locking the same in closed position.

In carrying out my invention I employ the novel combination, arrangement, and the details of construction hereinafter shown, described, and claimed.

In the accompanying drawings, illustrative of my invention, Figure 1 is an elevation of a fence-gate embodying my improvement. Fig. 2 is a longitudinal section. Fig. 3 is a plan view of the locking-yoke, and Fig. 4 is an elevation of the same.

Referring to the parts, 1 indicates a post to which the gate is to be locked, and 2 a post to which the gate is hinged at 3. The frame of the gate comprises front and rear vertical uprights 4 and 5, respectively, preferably of tubular or gas-pipe construction, a horizontal top bar 6, pivoted at 7 to the upper end of upright 5, and an extensible spring-actuated brace-rod connected at the ends with and disposed angularly between the rear upright 5 and the top bar 6, as shown. Brace-rod 8 is preferably constructed of a section of gas-pipe 9 and a rod 10, telescopic therewith, the rod being provided with an adjustable collar 11 and there being a coiled spring 12 interposed between the collar and the end of the gas-pipe 9. By the action of the coiled spring 12 the forward portion of the gate-frame will be raised the instant the same is unlocked. The upper end of the upright 4 is slidably secured to the top bar 6, so that when said upright is released by unlocking the gate the shortening of the gate-panel is permitted, due to the tension of the wires 13, secured at their ends to the uprights 4 and 5. The vertical upright 4 of the gate-frame is provided centrally with a forwardly-projecting hook 14, formed at the end of a rod 15, extending through said upright, the inner end of said rod being adjustably secured by means of nuts 16 to a truss-rod 17, having its ends secured to the upper and lower ends of the upright 4, the strain upon said upright 4 being therefore uniformly distributed and the bending of the same prevented. Upon suitable parallel supports 18, carried by the post 1, is pivotally mounted a yoke member 19, having the parallel sides 20 disposed apart to permit the upright 4 of the gate-frame to take a position therebetween and having the trunnions 21 extending outwardly at an intermediate point upon said sides and resting upon the supports 18, the cylindrical connecting portion 22 between the outer ends of the sides adapted to engage the hook 14, and outwardly-extending angular engaging arms 23 at the inner ends of the sides 20. The connecting portion 22 and the angular arms 23 take opposite positions with respect to the pivotal axis of the yoke. Upon the portion 22 are provided spaced ribs 24, adapted to guide the placing of the hook 14 thereon. Extending outwardly from the sides of the yoke are lugs 25, adapted to rest upon the supports 18 when the yoke is in locked position. (Indicated in the several figures of the drawings.)

26 are operating-levers loosely pivoted upon reduced portions 27 at the outer ends of the trunnions 21, being held from detachment by pins 28. The loose connection with the trunnions permits the operating-levers to be moved at will, as shown in dotted outline, Fig. 2, around the ends of the angular arms upon the yoke, so that either the upper or lower sides of said angular arms may be engaged to operate the yoke to lock or unlock the gate.

At 29 are shown spaced pairs of guide-rods projecting outwardly from the post 1 and adapted when the gate is locked to hold the same from twisting.

The gate is shown in locked position in Figs. 1 and 2, the yoke remaining in the position shown by reason of its outer portion, which engages the hook 14, having taken a position below its pivotal center. In full lines, Fig. 1, the operating-lever is shown in the position to which it would naturally fall after the gate has been locked, and in dotted outline in the same figure, and also in full lines, Fig. 2, the operating-lever is shown in position upon the angular arm of the yoke in readiness for the unlocking operation. By forcibly pressing the lever downward the outer end of the yoke will be moved upward above its pivotal center. The action of the spring brace-rod will cause the forward part of the frame to rise, the hook 14 taking the position *a*, Fig. 1, the unlocking of the gate being accomplished with little effort, the function of the operating-lever being simply to move the forward end of the yoke above or below its pivotal center.

To lock the gate, the hook 14 is attached to the portion 21 of the yoke, the latter being in vertical position when the gate is unlocked, and the operating-lever is brought into action to engage the lower side of the angular arm upon the yoke, the locking of the gate being accomplished by an upward movement of said lever.

There being two operating-levers, it is apparent that the operations of locking or unlocking may be performed with equal facility from either side of the gate.

Having described my invention, what I claim, and desire to secure by Letters Patent, is—

1. In a fence-gate, a frame provided with spring-actuated means for raising its forward end and having a hook projecting outwardly therefrom, a post, a yoke member pivoted upon said post adapted to engage the hook upon the frame, and a pivoted operating-lever detachably connected with said yoke member, substantially as described.

2. In a fence-gate, a frame provided with spring-actuated means for raising its forward end and having a hook projecting outwardly therefrom, a post, a yoke member pivotally supported upon said post having sides spaced apart to permit the forward end of the gate-frame to take a position therebetween, and having a transverse connecting portion to engage the hook upon the frame, and a pivoted operating-lever detachably connected with said yoke member, substantially as described.

3. In a fence-gate, a frame provided with spring-actuated means for raising its forward end and having a hook projecting outwardly therefrom, a post, fixed parallel supports carried by the post, a yoke member pivoted upon said supports having sides spaced apart, and having a transverse portion connecting said sides adapted to engage the hook upon the frame, lugs upon said sides adapted to rest upon the supports and limit the movement of the yoke, and an operating-lever for the yoke pivoted at one end and adapted to engage the yoke at a point remote from said pivoted end, substantially as described.

4. In a fence-gate, a frame provided with spring-actuated means for raising its forward end and having a hook projecting outwardly therefrom, a post, fixed parallel supports carried by the post, spaced pairs of guide-rods upon said post, a yoke member having parallel sides spaced apart and provided centrally thereof with trunnions adapted to rest upon the outer ends of said supports, and having a transverse connecting portion between the outer ends of the sides, outwardly-extending angular arms at the inner ends of the sides, lugs upon the sides to rest upon the supports, and operating-levers pivoted upon the trunnions of the yoke member adapted to detachably engage said angular arms, substantially as described.

In testimony that I claim the foregoing as my own I affix my signature in presence of two witnesses.

PETER MAST.

Witnesses:
LEVI AUCHAMPAUGH,
A. B. HEWES.